United States Patent [19]
Chi

[11] Patent Number: 5,783,226
[45] Date of Patent: Jul. 21, 1998

[54] EXTRUDER DEVICE

[76] Inventor: Huo Teng Chi, P.O. Box 63-99, Taichung, Taiwan

[21] Appl. No.: 910,357

[22] Filed: Aug. 13, 1997

[51] Int. Cl.$^6$ .............................. B29B 7/42; B29B 7/50; B29C 47/38
[52] U.S. Cl. .......................... 425/205; 425/207; 425/208; 425/209; 366/79; 366/88; 366/94; 366/95
[58] Field of Search ................................ 425/205, 207, 425/208, 209, 200; 366/79, 88, 224, 282, 232, 94, 95

[56] References Cited

U.S. PATENT DOCUMENTS

| | | |
|---|---|---|
| 4,795,599 | 1/1989 | Herrington .............................. 425/207 |
| 4,872,761 | 10/1989 | Creyer ..................................... 425/209 |
| 5,088,914 | 2/1992 | Brambilla ............................... 425/209 |
| 5,215,374 | 6/1993 | Meyer ..................................... 425/209 |
| 5,356,281 | 10/1994 | Katsum et al. ......................... 425/209 |

*Primary Examiner*—Khanh P. Nguyen

[57] ABSTRACT

An extruder device includes a rotor rotatably received in a housing and a tube secured to the rotor and having a helical screw formed in the outer portion. A screw member is engaged in the bore of the rotor and secured in the tube and rotated in concert with the tube and the rotor. The material to be extruded is supplied onto the tube and moved by the helical screw and then by the screw member. The helical screw includes a pitch greater than that of the screw member for allowing the helical screw of the tube to squeeze the material.

3 Claims, 3 Drawing Sheets

5,783,226

1

EXTRUDER DEVICE

BACKGROUND OF THE INVENTION

1. Field of the Invention

The present invention relates to an extruder device, and more particularly to an extruder device having a simplified configuration.

2. Description of the Prior Art

Typical extruders comprise a funnel for receiving the material to be extruded and a screw for extruding the material. However, a coupling device is required for coupling the screw to the driving mechanism such that the extruders normally include a large volume.

The present invention has arisen to mitigate and/or obviate the afore-described disadvantages of the conventional extruders.

SUMMARY OF THE INVENTION

The primary objective of the present invention is to provide an extruder device which includes a simplified configuration and which includes two screws having different pitches for allowing the material to be squeezed to a compact configuration.

In accordance with one aspect of the invention, there is provided an extruder device comprising a housing including an interior, a rotor rotatably engaged in the interior of the housing and including a bore, a tube secured to the rotor and including an outer peripheral portion having a helical screw, a screw member engaged in the bore of the rotor and including a first end secured in the tube and rotated in concert with the tube and the rotor, a nozzle secured to the housing and including an outlet, and means for supplying a material to the outer peripheral portion of the tube for allowing the material to be extruded and moved to the screw member by the helical screw and for allowing the material to be extruded outward of the nozzle via the outlet.

The tube includes an annular flange for securing to the rotor, the annular flange includes at least one opening for allowing the material to be moved from the outer peripheral portion of the tube to the screw member.

The helical screw includes a pitch greater than that of the screw member for allowing the helical screw of the tube to squeeze the material to a compact configuration.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
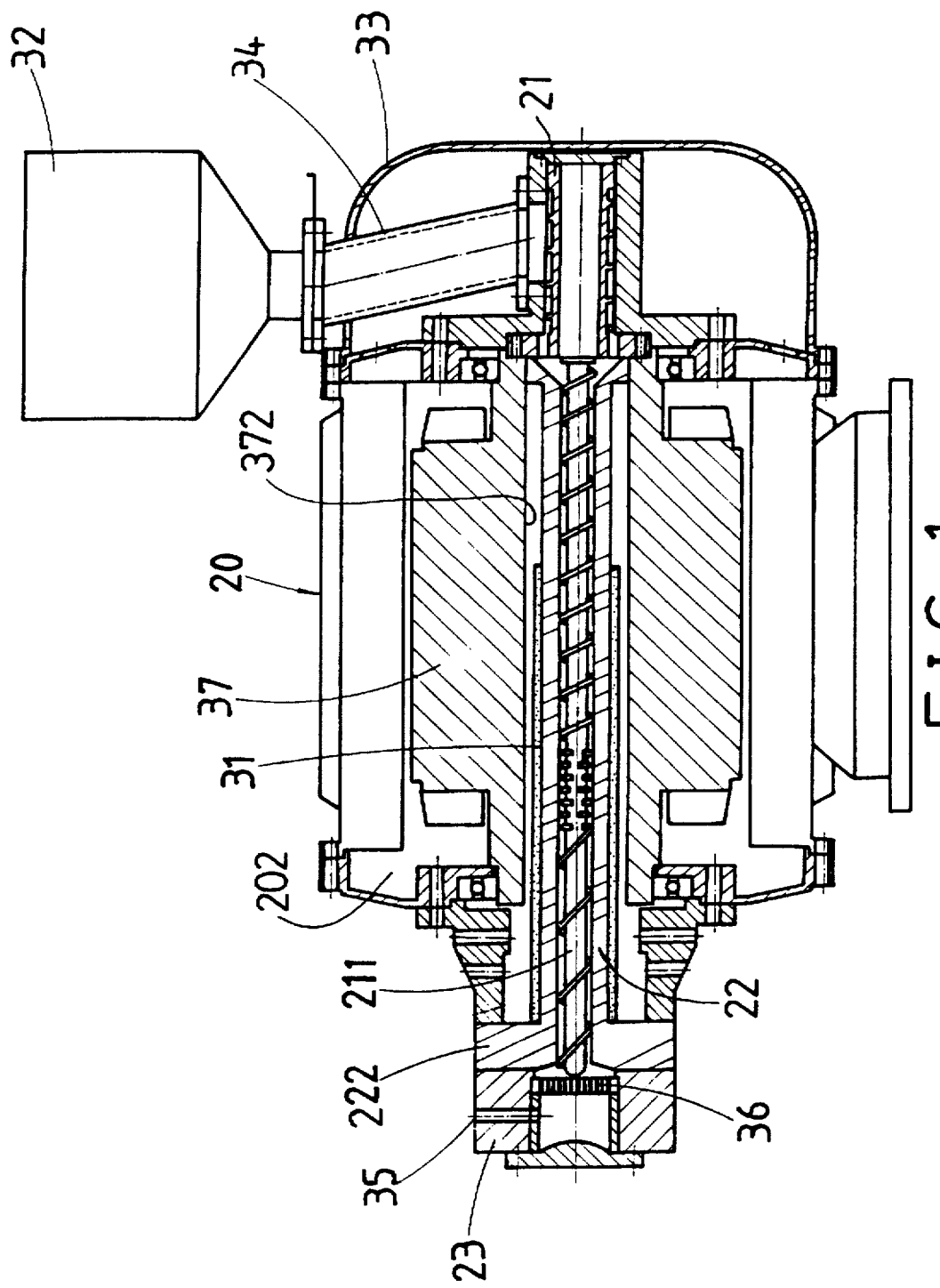
FIG. 1 is a cross sectional view of an extruder device in accordance with the present invention.
Figure 2:
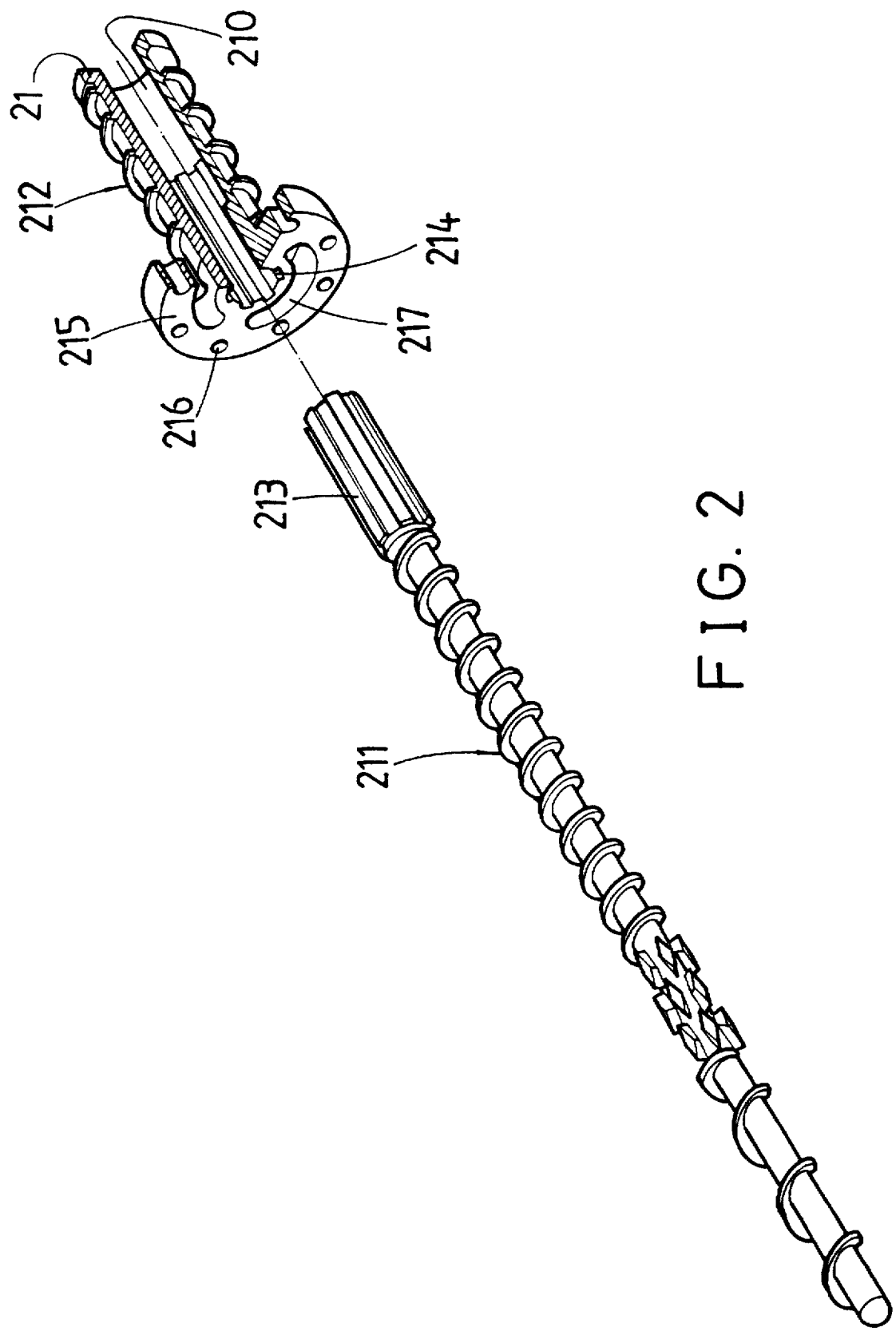
FIG. 2 is an exploded view of the screws.
Figure 3:
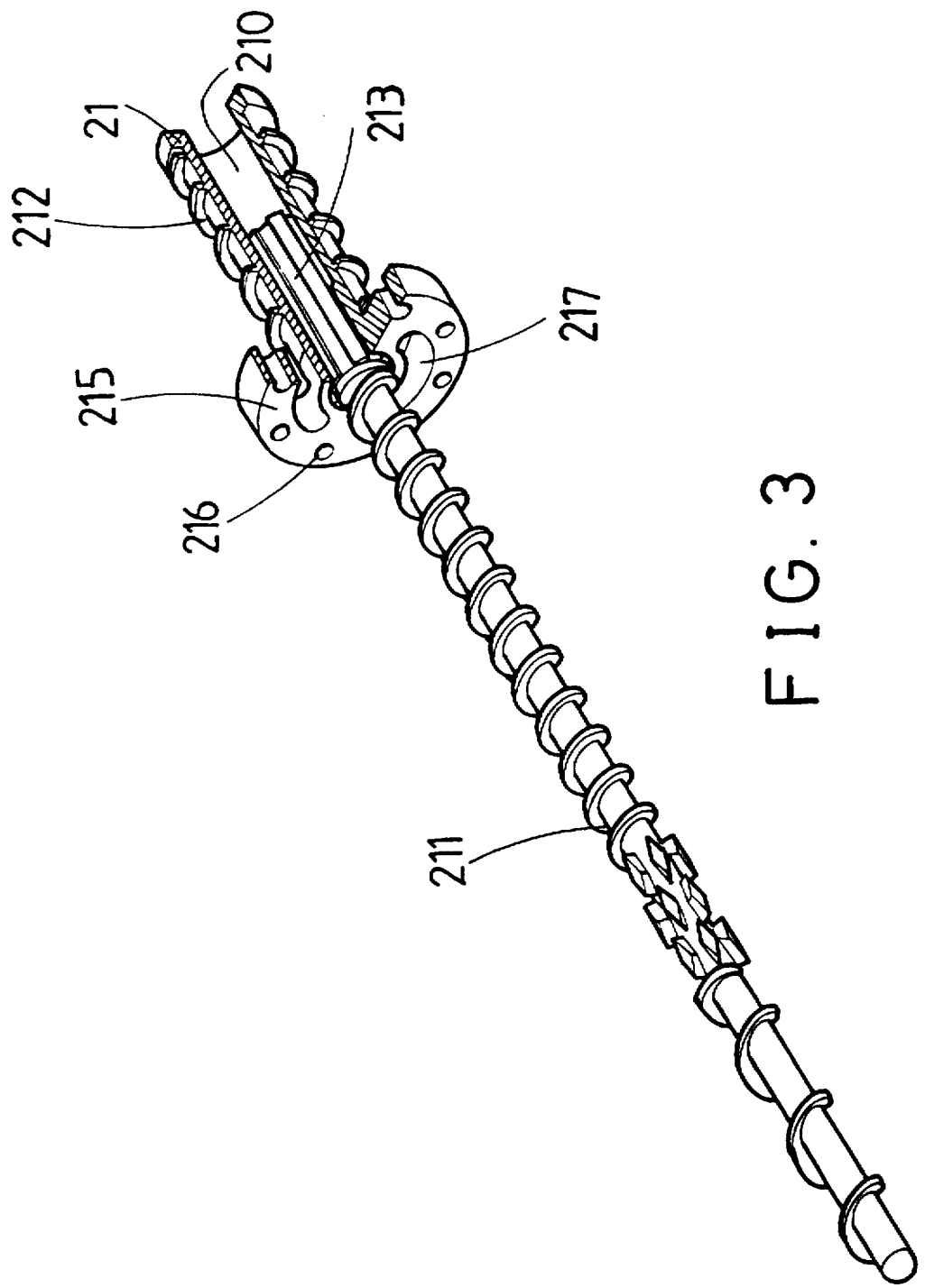
FIG. 3 is a perspective view of the screws.

Referring to the drawings, an extruder device in accordance with the present invention comprises a housing 20 including an interior 202 for rotatably receiving a rotor 37 which includes a bore 372. A tube 21 includes an annular flange 215 having a number of holes 216 for engaging with fasteners which may secure the tube 21 to the rotor 37 such that the tube 21 and the rotor 37 rotate in concert with each other. The tube 21 includes a helical screw 212 provided on the outer portion and includes a hole 210 having one or more grooves 214 formed in one end of the tube 21. The annular flange 215 includes one or more openings 217 for communicating with the outer peripheral portion of the tube 21. A funnel 32 is secured to the housing 20 for receiving the material to be extruded, such as meat, vegetable, plastic material etc. A pipe 34 couples the funnel 32 to the tube 21 for supplying the material to the outer portion of the tube 21 so as to be actuated by the helical screw 212. A cover 33 secured to the housing 20 for covering the pipe 34.

A screw member 211 is engaged in the bore 372 of the rotor 37 and includes one or more ribs 213 formed on one end for engaging with the grooves 214 of the tube 21 for securing the screw member 211 to the tube 21 and for allowing the screw member 211 to be rotated in concert with the tube 21. A sleeve 22 is engaged in the bore 372 of the rotor 37 and engaged on the screw member 211 and includes one end 222 extended outward of the housing 20. An electrical heating member 31 is engaged on the sleeve 22 for heating the sleeve 22 and the material extruded by the screw member 211 and for allowing the material to be easily extruded. A nozzle 23 is secured to the front portion of the housing 20 and includes a filter 36 for filtering the material to be extruded and includes an outlet 35 for allowing the material to be extruded outward of the nozzle 23.

In operation, as shown in FIG. 1, the material supplied onto the outer portion of the tube 21 may be extruded to the screw member 211 by the helical screw 212 through the openings 217. The material may then be extruded outward of the outlet 35 of the nozzle 23 by the screw member 211.

It is to be noted that the screw member 211 includes one end secured in the tube 21 which is secured to the rotor 37 such that the tube 21 and the screw member 211 may include a decreased length. It is preferable that the helical screw 212 includes a pitch greater than that of the screw member 211 such that the material extruded by the helical screw 212 may be moved for a distance greater than that moved by the screw member 211 such that the material may be extruded and squeezed to a compact size and configuration.

Accordingly, the extruder device in accordance with the present invention includes a screw member having one end engaged in and secured to a tube for reducing the size of the extruder device. In addition, the helical screw of the tube includes a pitch greater than that of the screw member for allowing the material to be extruded and squeezed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An extruder device comprising:

a housing including an interior, a rotor rotatably engaged in said interior of said housing and including a bore, a tube secured to said rotor and including an outer peripheral portion having a helical screw, a screw member engaged in said bore of said rotor and including a first end secured in said tube and rotated in concert with said tube and said rotor, a nozzle secured to said housing and including an outlet, and means for supplying a material to said outer peripheral portion of said tube for allowing the material to be extruded and moved to said screw member by said helical screw and for allowing the material to be extruded outward of said nozzle via said outlet.

2. An extruder device according to claim 1, wherein said tube includes an annular flange for securing to said rotor, said annular flange includes at least one opening for allowing the material to be moved from said outer peripheral portion of said tube to said screw member.

3. An extruder device according to claim 1, wherein said helical screw includes a pitch greater than that of said screw member for allowing said helical screw of said tube to squeeze the material.

* * * * *